Aug. 28, 1956     R. B. CRONHEIM     2,760,672
VENTED COVERS FOR COOKING VESSELS
Filed March 24, 1954

INVENTOR.
RICHARD B. CRONHEIM
BY
ATTORNEY

United States Patent Office 2,760,672
Patented Aug. 28, 1956

2,760,672

VENTED COVERS FOR COOKING VESSELS

Richard B. Cronheim, St. Louis, Mo.

Application March 24, 1954, Serial No. 418,318

2 Claims. (Cl. 220—44)

This invention relates in general to certain new and useful improvements in kitchen utensils and, more particularly, to a vented cover for a cooking vessel.

In frying meat, vegetables, and other food products in a cooking utensil, such as a skillet or frying pan, small globules of grease usually fly upwardly and out of the pan, occasionally burning the person doing the cooking and frequently soiling the stove or near-by area of the wall in the kitchen. Frequently this action is so violent that the grease will catch fire and cause considerable damage. This difficulty is particularly aggravated since it is not ordinarily possible to cover the frying pan or skillet without sacrificing crispness in the fried product and housewives, in an effort to produce an appetizing crispness in fried foods, feel that it is essential to use an uncovered cooking utensil for this purpose.

It is, therefore, the primary object of the present invention to provide a vented cover for a cooking vessel which is simple and economical in construction and will completely prevent any spattering of grease while at the same time permitting free and unimpeded dissipation of steam and the related gaseous products of the cooking operation, so that the resulting cooked food will be both crisp and appetizing.

It is another object of the present invention to provide a vented cover of the type stated which will fit cooking vessels of various different diametral sizes.

It is an additional object of the present invention to provide a vented cover of the type stated which may be very quickly and simply disassembled and reassembled for convenience in washing and cleaning.

With the above and other objects in view, my invention resides in the novel features of form, construction arrangement, and combination of parts presently described and pointed out in the claims.

In the accompanying drawing—

Figure 1:
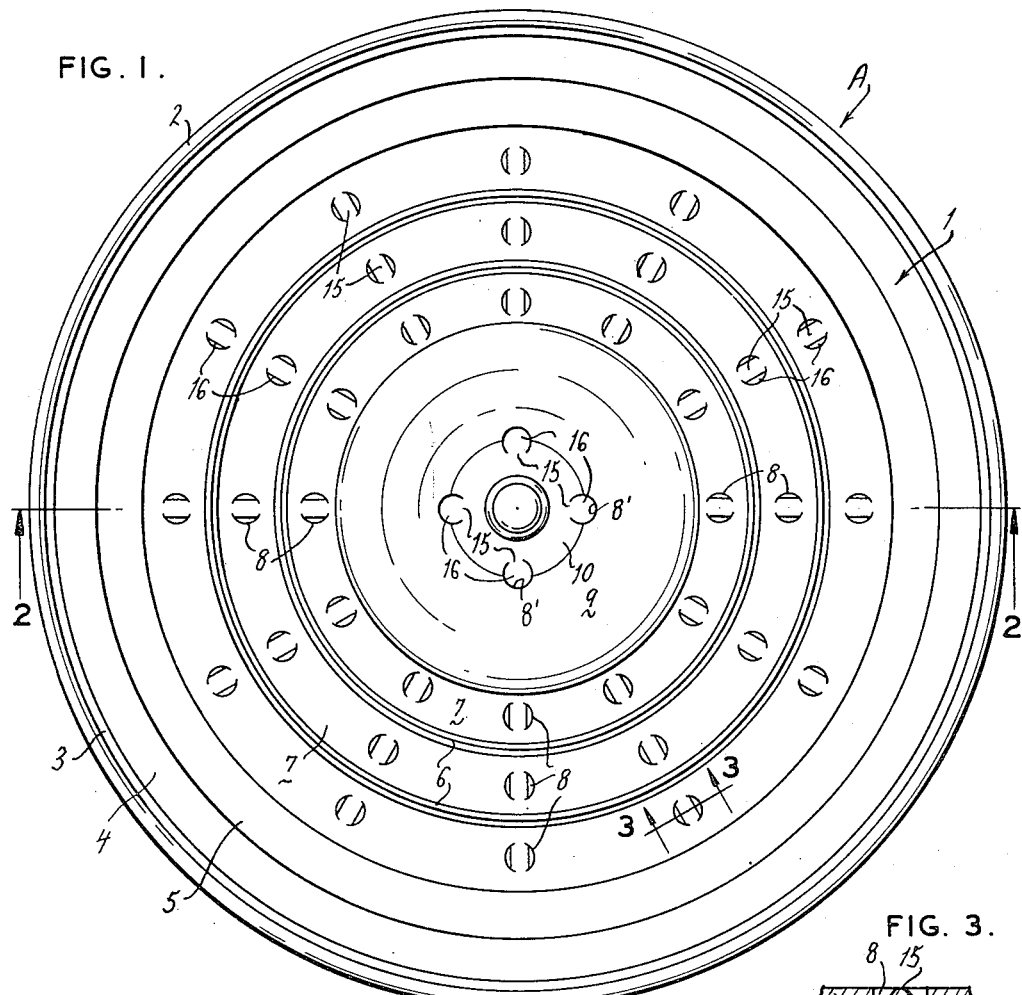
Figure 3:
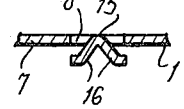
Figure 2:
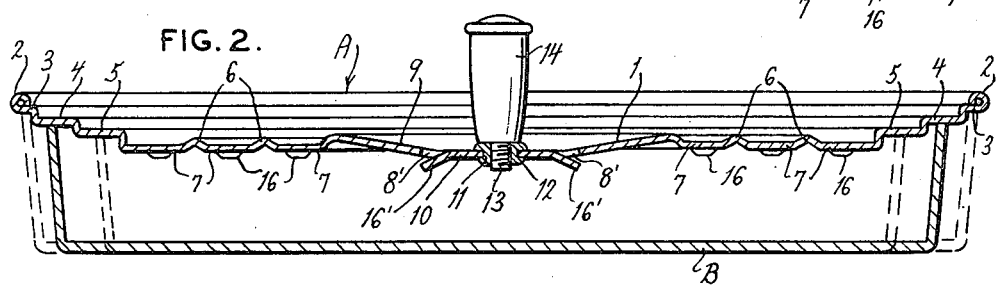
Figure 4:
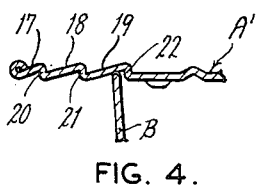
Figure 5:
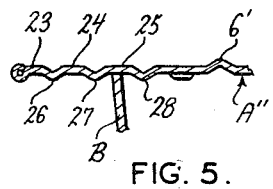

Figure 1 is a top plan view of a vented cover constructed in accordance with and embodying the present invention;

Figures 2 and 3 are transverse sectional views taken along lines 2—2 and 3—3, respectively, of Figure 1; and Figures 4 and 5 are fragmentary sectional views of a modified form of vented cooking covers constructed in accordance with and embodying the present invention.

Referring now in more detail and by reference characters to the drawing, which illustrates a preferred embodiment of the present invention, A designates a vented cooking comprising a substantially circular plate or disk 1 pressed or otherwise formed from sheet aluminum or other suitable material having an upwardly curled peripheral rim 2 and being provided inwardly of the rim 2 with a series of concentric step-like ledges 3, 4, 5, adapted, respectively, to fit within the upper peripheral margin of a conventional frying pan B, as shown in full lines in Figure 2. For purposes of illustration, frying pans of different sizes have been schematically illustrated in dotted lines in Figure 2 and it should be understood in this connection that frying pans of intermediate size may also be utilized and will either engage snugly against one of the ledges 3, 4, 5, or impinge against the flat areas therebetween.

Interiorly of the ledge 5, the disk 1 is provided with a uniformly spaced series of concentric upwardly pressed corrugations 6 having intermediate annular flat areas 7 which are provided with circular apertures 8. By referring to Figure 1, it will be noted that the apertures 8 in one of the flat areas 7 are radially aligned with corresponding apertures 8 in the other flat areas 7 so that the apertures 8 are aligned very much like the spokes of a wheel. In its central area, the disk 1 is dished downwardly in somewhat conical manner in the formation of a depression or well 9 which is, in turn, centrally provided with a flat bottomed central section 10 having a central aperture 11. The central section 10 is also provided with liquid-drainage apertures 8'.

Mounted in the aperture 11 and retentively upset therein is an internally threaded metallic grommet 12 for receiving and loosely accommodating a short bolt 13 having a diametrally enlarged handle-forming knob 14. As will be seen by reference to Figures 2 and 3, each of the apertures 8 are only partially stamped and are, in effect, connected by thin diametral filaments 15 having angularly downwardly punched arcuate flanges 16. It will be noted by reference to Figure 1 that the filaments 15 are oriented in a radial direction and are aligned with corresponding filaments 15 of the other apertures in the same radial line, so to speak, and the flanges 16 are deflected in directions approximately at 90° to the direction of the filaments 15. It should also be noted in this connection that the liquid-drainage apertures 8' have single downstruck flanges 16' which serve as baffles to prevent outward movement of grease particles.

When in use, the vented cooking cover A may be placed over the frying pan B, as shown in Figure 2, and the steam, water vapor and other gaseous products of cooking will freely circulate through the aperture 8 and pass outwardly therethrough. Liquid globules of frying grease, however, which must necessarily travel in a substantially straight line or at least along a defined trajectory, will, for the most part, be deflected back into the frying pan B by the under surfaces of the disk 1 and the flanges 16. When the user desires to add water to the skillet during the course of cooking, as is frequently considered necessary, it is possible to do so very quickly and conveniently without removing the vented cover A by pouring the water into the depression or well 9, whence it will drain through the apertures 8' into the interior of the frying pan B. The agitation of the grease which invariably results from the addition of liquids to the contents of a hot frying pan will, of course, be held within the frying pan and prevented from flying upwardly and outwardly to damage the walls, harm the cook, and create a fire hazard.

After the cooking operations have been concluded, the vented cover A may be very simply washed and cleansed by unscrewing the handle-forming knob 14 so that the components can be separately washed, dried, and put back together again.

If desired, it is possible to provide a modified form of vented cover A', as shown in Figure 4, which is substantially similar to the preveiously described vented cover A except that the outer peripheral portion adapted for engagement with a cooking utensil or frying pan is not flat, but instead consists of a series of annular oblique areas 17, 18, 19, respectively separated by substantially vertical shoulders or ridges 20, 21, 22. By the employment of this expedient, it is possible to provide a cover which is relatively compact in vertical thickness and, furthermore, is substantially self-centering with respect to the cooking utensil upon which it is placed.

It is also possible to provide a further modified form of vented cover A″, as shown in Figure 5, which is substantially similar in all respects to the previously described vented cover A and includes a series of concentric annular corrugations 6′ substantially similar to the corrugations 6 of the previously described vented cover A. The vented cover A″, however, is provided around its outer peripheral portion adapted for engagement with the cooking utensil with a series of flat areas 23, 24, 25, which are substantially co-planar with the vented interior area of the cover A″ and are separated by annular corrugations 26, 27, 28, which are stamped downwardly, that is to say in such a manner as to project on the opposite side of the cover A″ with respect to the corrugations 6′. This form of the invention also provides a relatively compact or thin type of lid which can be easily and conveniently shipped and stored.

It should be understood that changes and modifications in the form, construction, arrangement, and combination of the several parts of the vented covers for cooking vessels may be made and substituted for those herein shown and described without departing from the nature and principle of my invention.

Having thus described my invention, what I claim and desire to secure by Letters Patent is:

1. A vented lid for frying pans and similar cooking utensils comprising a single dish-like member having an upstanding handle, said member having an annular rim around its outer margin and being provided adjacent such margin with an annular zone having a series of spaced concentric ridges of decreasing diametric size and arranged in successively lower planes with respect to the plane of the rim for fitting the upper marginal edges of utensils of various different sizes, said member further being provided in the area inwardly of said zone with a series of spaced concentric corrugations separated by annular, substantially flat co-planar zones located in downwardly spaced relation to the plane of the rim, each of said zones being provided with an annular series of apertures, said apertures being provided with downwardly projecting baffle-forming wings presented angularly to the plane of the flat zones and being held in place by filaments extending diametrally through each aperture, the filaments in one flat zone being angularly in radial alignment with respect to the filaments in adjacent flat zones.

2. A vented lid for frying pans and similar cooking utensils comprising a single dish-like member having an upstanding handle, said member having an annular rim around its outer margin and being provided adjacent such margin with an annular zone having a series of spaced concentric ridges of decreasing diametric size and arranged in successively lower planes with respect to the plane of the rim for fitting the upper marginal edges of utensils of various different sizes, said member further being provided in the area inwardly of said zone with a series of spaced concentric corrugations separated by annular, substantially flat co-planar zones located in downwardly spaced relation to the plane of the rim, each of said zones being provided with an annular series of apertures, said apertures being provided with downwardly projecting baffle-forming wings presented angularly to the plane of the flat zones and being held in place by filaments extending diametrally through each aperture, the filaments in each flat zone being positioned in a radial direction and the filaments in adjacent zones being positioned in radial alignment with filaments in adjacent zones.

References Cited in the file of this patent

UNITED STATES PATENTS

| | | |
|---|---|---|
| 2,114,823 | Toscano | Apr. 19, 1938 |
| 2,348,452 | Christopher | May 9, 1944 |
| 2,643,024 | Cronheim | June 23, 1953 |